United States Patent [19]

Dlubak

[11] Patent Number: 5,122,619
[45] Date of Patent: Jun. 16, 1992

[54] RADIATION SHIELD FOR DISPLAY TERMINALS

[76] Inventor: Frank C. Dlubak, R.D. 8, P.O. Box 26, Kittanning, Pa. 16201

[21] Appl. No.: 723,787
[22] Filed: Jul. 1, 1991
[51] Int. Cl.⁵ ............................................. H05K 9/00
[52] U.S. Cl. ............................ 174/35 R; 174/35 MS; 358/245; 358/247
[58] Field of Search ...................... 174/35 R, 35 MS; 358/242, 244, 245, 247, 250, 251, 252, 253, 254, 255

[56] References Cited

U.S. PATENT DOCUMENTS

| | | |
|---|---|---|
| 3,781,080 | 12/1973 | Aftergut . |
| 4,210,357 | 7/1980 | Adachi . |
| 4,468,702 | 8/1984 | Jandrell ............................. 358/245 |
| 4,633,322 | 12/1986 | Fourny ............................... 358/252 |
| 4,760,456 | 7/1988 | Liang .................................. 358/245 |
| 4,905,089 | 2/1990 | Liang et al. ......................... 358/247 |
| 4,910,090 | 3/1990 | Kuhlman et al. .................... 428/469 |

FOREIGN PATENT DOCUMENTS 63-48980  3/1988  Japan .

*Primary Examiner*—Leo P. Picard
*Assistant Examiner*—Bot Lee Ledynh
*Attorney, Agent, or Firm*—Joseph J. Carducci

[57] ABSTRACT

A radiation shield for visual display terminals capable of being mounted in front of a visual display terminal for attenuating electromagnetic fields emanating from such visual display terminal which comprises a sheet of glass carrying on at least one face a layer of conductive metal that does not appreciably impair visibility through the coated glass and metal grounding member ultrasonically bonded to the glass sheet solely at one location adjacent to a corner of the glass sheet.

6 Claims, 1 Drawing Sheet

RADIATION SHIELD FOR DISPLAY TERMINALS

BACKGROUND OF THE INVENTION

1. Field of the Invention

This invention relates to radiation shields for visual display terminals (VDT) capable of being mounted in front of a VDT for attenuating, or reducing, electromagnetic E/fields emanating therefrom, such as those in the very low frequency field range from about 15,000 Hz to about 16,000 Hz, particularly in the extra low frequency range of about 3 Hz to about 3,000 Hz, that are capable of reaching the user of a VTD, said radiation shield comprising a sheet of glass carrying on at least one of the surfaces thereof a layer of conductive metal that does not appreciably impair visability through said sheet of glass and metallic grounding means ultrasonically bonded to said glass sheet solely at one location adjacent to a corner of said glass sheet.

2. Description of the Prior Art

Video display terminals (VDT) employing a cathode ray tube (CRT) on whose face is displayed information, for example, in the form of letters or numbers, are in widespread use, and it is well known that emanating therefrom are, for example, X-ray and ultraviolet radiations, very low frequency fields ranging from about 15,000 Hz to about 16,000 Hz (VLF), particularly extra low frequency fields ranging from about 3 Hz to about 3,000 Hz (ELF) pose serious health problems to users thereof. This is discussed in great detail in the literature, for example, in U.S. Pat. Nos. 4,661,856 to Schnack, 4,788,597 to Gart et al and 4,864,190 to Orr.

There have been many attempts, involving a great many approaches, to provide means to protect a VDT user from such undesirable emanations, including placing a shield between the CRT and the user. For example, Schnack in U.S. Pat. No. 4,661,856, referred to above, discloses a device adapted to be placed on the face of a CRT that includes an opaque, conductive mesh and a spherical frame having the same curvature as the CRT. Gart et al in U.S. Pat. No. 4,788,597, also referred to above, similarly disclose a filter composed of a micro mesh screen, usually made of woven fabric, comforming to the face of the CRT. In U.S. Pat. No. 4,839,736, Sugihara et al also disclose a filter designed to be attached to the face of a CRT comprising a base film having a thickness of from 10 to 250 microns, composed of an organic resin, carrying a conductive film, wherein the rigidity thereof can be improved by laminating therewith a sheet having suitable rigidity, such as other organic resins or glass. Orr in U.S. Pat. No. 4,864,190, also referred to above, also uses a screen composed of fine wires of stainless steel. Kuhlman et al in U.S. Pat. No. 4,910,090 disclose a multilayer composite filter, including a plastic substrate and an inner conductive layer.

Means other than filters designed to be mounted on or in front of a CRT have also been utilized. Thus, in U.S. Pat. No. 4,670,347 Lasik et al disclose a laminate composed of a thin polyester layer carrying a layer of silver and a second polyester layer adhesively attached to said silver coated first polyester layer adapted to surround the electronic circuitry and to be in contact with the housing. Unsworth et al in U.S. Pat. No. 4,826,718 disclose an electromagnetic shielding laminate composed of a first pane of glass carrying an electroconductive coating on its inner face, a plastic layer in contact with the inner layer, a second pane of glass over the interlayer, and a border of fine electroconductive mesh between the interlayer and the electroconductive coating in electrical contact with the electroconductive coating. In U.S. Pat. No. 4,874,903 Clarke discloses a panel composed of first pane of glass carrying a layer of silver and an electroconductive mesh in contact with the layers of silver all around the periphery of the panel.

None of the above, however, discloses or teaches the radiation shield described and claimed herein, namely, one comprising a sheet of glass carrying on at least one of the surfaces thereof a layer of conductive metal that does not appreciably impair visability through said sheet of glass and metallic grounding means ultrasonically bonded to said glass sheet solely at one location adjacent a corner thereof. The glass sheet so prepared can be placed in front of a VDT, and, when grounded will prevent any appreciable passage therethrough of electrical fields emanating from said VDT.

SUMMARY OF THE INVENTION

The invention described and claimed herein comprises a sheet of glass carrying on at least one of the surfaces thereof a layer of conductive metal that does not appreciable impair visability through said sheet of glass and metallic grounding means ultrasonically bonded to said glass sheet solely at one location adjacent a corner thereof.

BRIEF DESCRIPTION OF THE INVENTION

Figure 1:
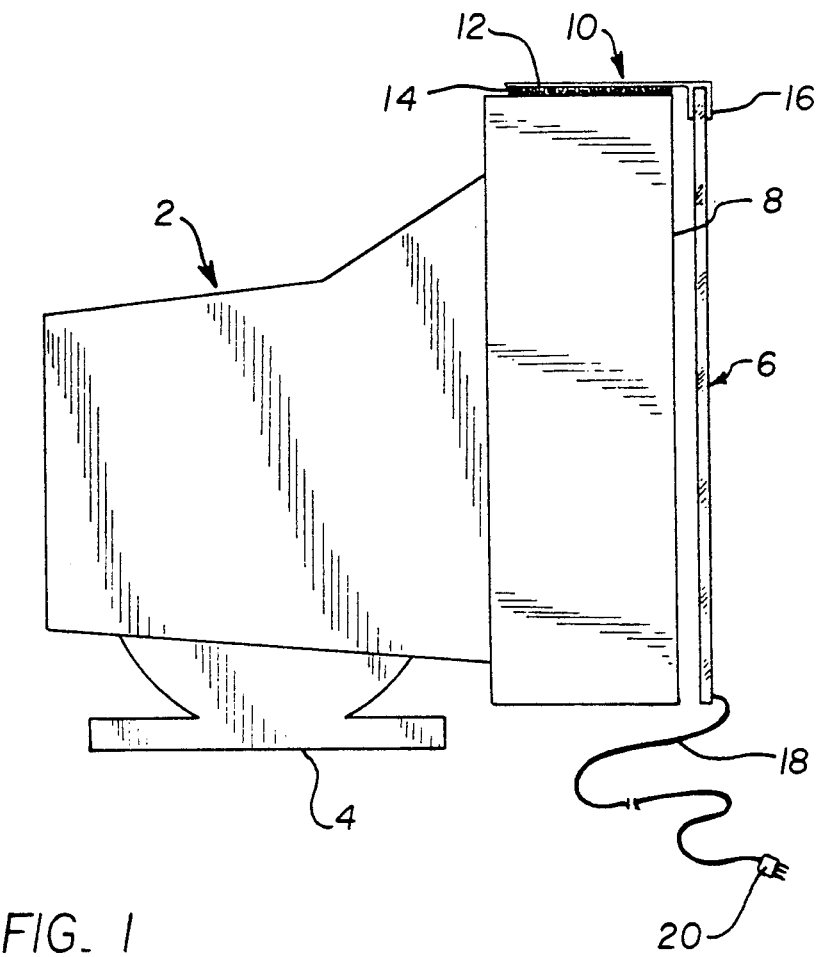
FIG. 1 is a side elevational view of a typical VDT on which is mounted a preferred embodiment of the radiation shield described and claimed herein.

Referring to FIG. 1, there is shown a visual display terminal unit 2 mounted on a base 4 with the glass shield 6 of this invention positioned in front of the face 8 of the visual display terminal unit 2. The glass shield 6 can be positioned, for example, from about one-eighth to about five inches in front of the face 8 by any suitable means, for example, as shown in FIG. 1, using a plastic member 10 having a horizontal portion 12 thereof removably attached to the top of the visual terminal display unit 2 through means such as a loop and hook containing device 14 made of non-metallic fibers, such as nylon. The other end of the plastic member 10 is provided with an inverted U-shaped portion 16 in which the glass shield 6 is firmly, but detachably, held. When it is desired to remove the shield 6 from the plastic member 10, it is merely pulled out from its engagement with the U-shaped portion thereof. Attached to one corner of the glass shield 6 by ultrasonic bonding, as explained below, is a ground metallic wire 18 made, for example, of copper braid. The other end of the ground wire is provided with a plug 20 that can be inserted into an electrical wall recepticle for grounding.

Figure 2:
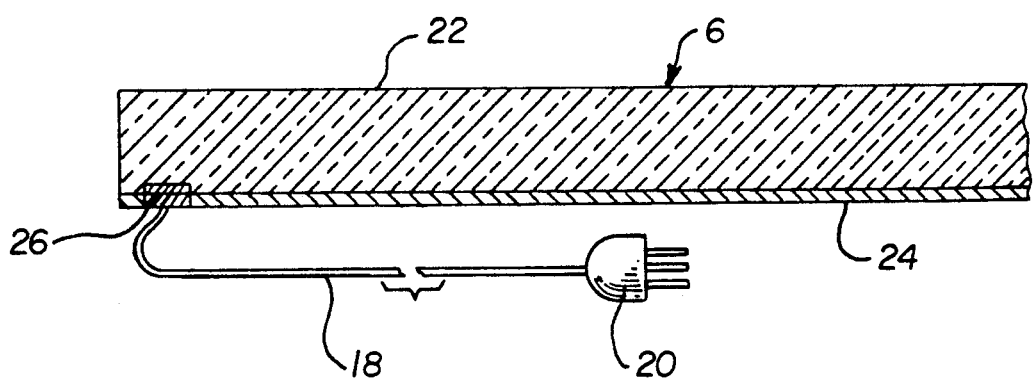
FIG. 2 is a sectional view through the radiation shield disclosed and claimed herein.

FIG. 2, which is a sectional view through the glass shield 6, is composed of a glass, for example, a clear float glass 22, carrying a conductive metal coating 24. As noted above, and as will be explained further hereinafter, the ground metallic wire 18 is ultrasonically bonded to electroconductive coating 24 through means of ultrasonic bond 26, which I believe penetrates through the conductive metal coating 24 and into the body of the glass 22.

The radiation shield, generally rectangular, can be made of any clear glass, for example, float glass, and will have dimensions commensurate with, and slightly larger than, the dimension of the face of the VDT, and a thickness of about 1/16 to about ½ inch, preferably ⅛ to about ¼ inch.

The conductive metal coating can be prepared from many metals, for example, silver, copper, gold, nickel, platinum, palladium, bismuth, antimony, combinations thereof, as well as their oxides, using spraying or roller coating means, for example, at temperatures of about 1100° to about 1200° F., or vacuum deposition at temperatures, for example, in the range of about 600° to about 800° F. Application of the metal using silk screening processes is not recommended, since the resulting film will tend to be opaque. The thickness of the film will generally be in the range of about five to about 300 microns, preferably within the range of about 10 to about 200 microns, and its electrical resistance will be in the range of about 7.5 to about 10,000 ohms per square, but generally within a range of about 10 to about 100 ohms per square. The amount of visible light able to pass through such coating will be in the range of about 60 to about 100 percent, generally in the range of about 80 to about 100 percent.

The ground wire, attached to the coating at one end thereof and to the other to any suitable ground, for example, to an ordinary electrical outlet, can be made of any suitable metal, such as copper. It is critical, however, that such ground wire be attached directly through a metal bond ultrasonically applied to the electroconductive coating on the glass surface. By "ultrasonic bonding" I mean that the bonding is applied using a bonding iron vibrating at ultrasonic speeds and at high temperatures, for example, from about 200° to about 800° F. In addition, it is also critical that the ground wire be bonded solely at one location on the conductive film adjacent to a corner thereof, that is, for example, within about a four-inch corner square, preferably within about a one-inch corner square.

The uniqueness of the present invention can be further illustrated by reference to the following specific examples.

Several pieces of float glass, each having a length of 12 inches, a width of 12 inches and a thickness of 0.125 inch were coated on one side only by spraying thereon tin oxide in a silver nitrate solution, the solution being at ambient temperature and the glass at 1200° F., to obtain a conductive coating having a thickness of 30 microns. There was then applied to the conductive coating on the glass surface, which was at ambient temperature, a lead-bismuth-gold solder, which was at a temperature of about 550° F., using an ultrasonic bonding tip with a soldering head vibrating ultrasonically at 200 watts and 19 KHz., resulting in a spot coating having a thickness of about 30 microns. To the latter coating there was attached a copper braided wire (#16–26 strand, ½-inch, 600 volts) using the same ultrasonic bonding technique at 125° F. To the other end of the copper braided wire was attached a plug suitable for fitting into an electrical outlet for grounding. In Test No. 1 the bonding was made at a point adjacent one corner only, one inch away from each adjacent edge. In Test No. 2, the bonding was made at the center of the film. In Test No. 3 two bondings were made at opposite corners, each one inch away from an adjacent edge. In Test No. 4, two such bondings were made, each adjacent the same corner, each one inch away from an adjacent edge, but on opposite sides of the glass. In a fifth test, the braided copper wire was not soldered to the coating but was attached thereto using a metallic clamp, made of copper, adjacent a corner of the glass one inch away from each adjacent edge. In Test No. 6, the braided copper wire was attached to the conductive layer at the same location as in Test No. 1 but, instead of ultrasonic bonding, using conventional solder bonding containing tin oxide and bismuth at 125° F. In Test No. 7 a continuous copper metal frame, U-shape in cross-section, was placed totally around the edges of the coated glass plate, overlapping the edges by one-half inch, and the copper braided wire was solder bonded thereto as in Test No. 6.

In each of the above runs, the defined coated glass configurations described above were attached to a standard computer monitor (Jem), having a 12"×12"-screen so that the coated glass was on average approximately one inch away from the monitor face. An Instrument for Industry Voltmeter LSD, made by Instruments for Industry Corporation, was used to measure the volt radiation transmitted through each of the above sheets of glass. In each case the coated glass sheet was grounded. When the measurement was taken with no coated glass interposed between the voltmeter and the face of the VDT, the reading on the voltmeter was 10.

The results obtained are set forth below in the following table.

TABLE

| Test No. | Volt Meters |
| --- | --- |
| Reference (no glass shield used) | 10 |
| (1) Solderbond at corner of the glass plate | 0 |
| (2) Solderbond at center of the glass plate | 2 |
| (3) Two solderbonds at opposite corners of the glass plate | 3 |
| (4) Two solderbonds at the corner of glass plate, but on opposite sides thereof | 3 |
| (5) Metal clip attached near corner of glass plate | 3 |
| (6) Attached to corner using conventional soldering means | 8 |
| (7) Continous metal frame around glass plate | 3 |

The results obtained are most unusual. In Test No. 1, using the radiation shield defined and claimed herein, no radiation was permitted to penetrate the coated glass plate. When the ground wire was ultrasonically bonded to the center of the glass plate in Test No. 2 only 80 percent of the radiation was captured and grounded. Interestingly, when in Test No. 3 solderbonding was used at two locations, each at a corner thereof, instead of an improvement, radiation protection was further reduced, and similarly in Test No. 4. Using a metal clip in Test No. 5 also did not result in an improvement. The least attractive method for bonding a ground wire appears in Test No. 6, wherein conventional soldering was used, the coated glass plate was able to capture but 20 percent of the radiation in contact therewith. A continuous metal frame surrounding the coated glass shield in Test No. 7 was no better than the means used in Tests Nos. 3, 4 and 5.

Obviously, many modifications and variations of the invention, as hereinabove set forth, can be made without departing from the spirit and scope thereof and therefore only such limitations should be imposed as are indicated in the appended claims.

I claim:

1. A radiation shield for visual display terminals capable of being mounted in front of a visual display terminal for attenuating electromagnetic fields emanating therefrom which comprises a sheet of glass carrying on at least one face thereof a layer of conductive metal that does not appreciably impair visability through said sheet of glass and metallic grounding means ultrasonically bonded to said layer of conductive metal on said glass sheet solely at one location adjacent a corner thereof.

2. The radiation shield of claim 1 wherein said layer of conductive metal has a thickness of about 5 to about 300 microns.

3. The radiation shield of claim 1 wherein said layer of conductive metal has a thickness of about 10 to about 200 microns.

4. The radiation shield of claim 1 wherein said layer of conductive metal is made from a tin oxide in a silver nitrate solution.

5. The radiation shield of claim 1 wherein said metallic grounding means is bonded to said conductive metal layer within a four inch corner square.

6. The radiation shield of claim 1 wherein said metallic grounding means is bonded to said conductive metal layer within a one inch corner square.

* * * * *